United States Patent
Witzel

(10) Patent No.: US 6,896,004 B1
(45) Date of Patent: May 24, 2005

(54) TWO-PIECE CASING SPACER FOR USE WITH PIPES OF VARIOUS DIAMETERS

(75) Inventor: William N. Witzel, Ottawa, IL (US)

(73) Assignee: Cascade Waterworks Mfg. Co., Yorkville, IL (US)

( * ) Notice: Subject to any disclaimer, the term of this patent is extended or adjusted under 35 U.S.C. 154(b) by 112 days.

(21) Appl. No.: 10/843,146

(22) Filed: May 11, 2004

(51) Int. Cl.[7] ................................................ F16L 9/18
(52) U.S. Cl. ...................... 138/112; 138/108; 138/113
(58) Field of Search ................................ 138/108, 112, 138/113, 114, 159, 148

(56) References Cited

U.S. PATENT DOCUMENTS

| | | | |
|---|---|---|---|
| 1,931,694 A | 10/1933 | Hall | 138/159 |
| 2,868,230 A | 1/1959 | Stokes | 138/113 |
| 2,890,724 A | 6/1959 | Kennedy, Jr. | 138/113 |
| 2,896,669 A | 7/1959 | Broadway et al. | 138/113 |
| 2,938,569 A | 5/1960 | Goodrich | 138/113 |
| 3,540,487 A | 11/1970 | LoRusso | 138/112 |
| 3,789,129 A | 1/1974 | Ditscheid | 138/113 X |
| 3,882,382 A | 5/1975 | Johnson | 138/104 |
| 3,996,414 A | 12/1976 | Artbauer et al. | 174/28 |
| 4,095,041 A | 6/1978 | Netzel et al. | 138/114 X |
| 4,100,367 A | 7/1978 | Netzel | 138/113 X |
| 4,182,378 A | 1/1980 | Dieter | 138/112 |
| 4,233,816 A | 11/1980 | Hensley | 138/112 X |
| 4,280,535 A | 7/1981 | Willis | 138/112 |
| 4,455,112 A | 6/1984 | Anders | 138/112 |
| 4,896,701 A | 1/1990 | Young | 138/108 |
| 5,069,255 A | 12/1991 | Muszynski | 138/113 |
| 5,404,914 A * | 4/1995 | Ziu | 138/113 |
| 5,441,082 A | 8/1995 | Eskew et al. | 138/112 |
| 5,496,134 A * | 3/1996 | Goehner | 405/154.1 |
| 5,592,975 A | 1/1997 | Wissman et al. | 138/112 |
| 5,692,544 A * | 12/1997 | Friedrich et al. | 138/99 |
| 5,934,334 A | 8/1999 | Gray, Jr. et al. | 138/112 |
| 6,003,559 A | 12/1999 | Baker | 138/108 |
| 6,032,698 A | 3/2000 | Schwert et al. | 138/98 |
| 6,050,300 A | 4/2000 | Schwert et al. | 138/98 |
| 6,158,475 A * | 12/2000 | Clemmer | 138/112 |
| 6,161,589 A | 12/2000 | Bolotte et al. | 138/106 |
| 6,571,832 B1 | 6/2003 | Elliott | 138/108 |
| 6,736,166 B2 * | 5/2004 | Calais et al. | 138/112 |

FOREIGN PATENT DOCUMENTS

| | | |
|---|---|---|
| DE | EPO 784179 | 7/1997 |
| WO | WO 0181806 | 11/2001 |
| WO | WO 0181807 | 11/2001 |
| WO | WO 0208140 | 1/2002 |

OTHER PUBLICATIONS

"All Stainless Steel Casing Spacers; Position Pipe within Casing Under Roadways, Railroads, Bridges, and Canals, Ideal for Sliplining." Brochure by Cascade Waterworks Mfg. Co., Yorkville, Illinois,1998, No. 3000.99, pp. 1–8.

(Continued)

Primary Examiner—Patrick Brinson
(74) Attorney, Agent, or Firm—Emrich & Dithmar

(57) ABSTRACT

A casing spacer comprised of high strength plastic includes two complementary nut and bolt connected members each having an arcuate inner portion adapted for tight-fitting engagement with a pipe's outer surface and plural linear ribs (risers) extending radially outwardly from the arcuate inner portion and adapted to engage an inner surface of an outer casing maintains the pipe in fixed position within the casing. The arcuate inner portion of each member is flexible so that its entire inner surface contacts the pipe's outer surface for a range of pipe diameters, permitting only two members of fixed size to be used with variously sized pipes. Each casing spacer member includes an aperture in its flexible, arcuate inner portion which is disposed between aligned risers and is adapted to receive and retain a non-slip member frictionally engaging the pipe's outer surface for maintaining the casing spacer in fixed position on the pipe.

15 Claims, 3 Drawing Sheets

OTHER PUBLICATIONS

"All Stainless Steel Casing Spacers; Position Pipe within Casing Under Roadways, Railroads, Bridges, and Canals, Ideal for Sliplining." Tri–fold brochure by Cascade Waterworks Mfg. Co., Yorkville, Illinois, pp. 1–6.

"CASCADE, All Stainless Steel Casing Spacers; A System to Position Water and Sewer Pipe in Casings Used for Road Crossings." Brochure by Cascade Waterworks Mfg. Co., Yorkville, Illinois, No. 9/87, pp. 1–4.

"Non–Metallic Casing Spacers; Commander Series/Lieutenant Commander Series." Brochure by Cascade Waterworks Mfg. Co., Yorkville, Illinois, 2001, pp. 1–6.

"Phoenix Gold Series"; Tri–Fold Brochure by Cascade Waterworks Mfg. Co., Yorkville, Illinois, 2002, pp. 1–6.

"Casing Spacers, For Positioning Water & Sewer Pipelines within Casing." Tri–fold brochure by Advance Products & Systems, Inc., Lafayette, Louisiana, pp. 1–6.

"Casing Insulators and End Seals." Brochure by Advance Products & Systems, Inc., Lafayette, Louisiana. pp. 1–4.

"Casing Spacers & Insulators; NEW Now with Field Adjustable Runners." Brochure by Advance Products & Systems, Inc., Lafayette, Louisiana, Aug. 31, 2002, pp. 1–12.

"Casing Chocks, Model 4810; For Positioning Carrier Pipe within Casing." Brochure by PowerSeal Pipeline Products Corporation, Wichita Falls, Texas, pp. 1–4.

"Casing Seals and Insulators." Brochure by Pipeline Seal & Insulator, Inc., Houston, Texas, 1988, No. PI–SIC–1190, pp. 1–10.

"Ranger Casing Spacers." Brochure by Pipeline Seal and Insulator, Inc., Houston, Texas, 2001, No. PSI–RII–1/01, pp. 1–8.

"Metallic Casing Spacers; Designed Especially for Water and Sewer Cased Pipelines." Brochure by Pipeline Seal and Insulator, Inc., Houston, Texas, 2001, No. PSI–MCS–05/01, pp. 1–8.

* cited by examiner

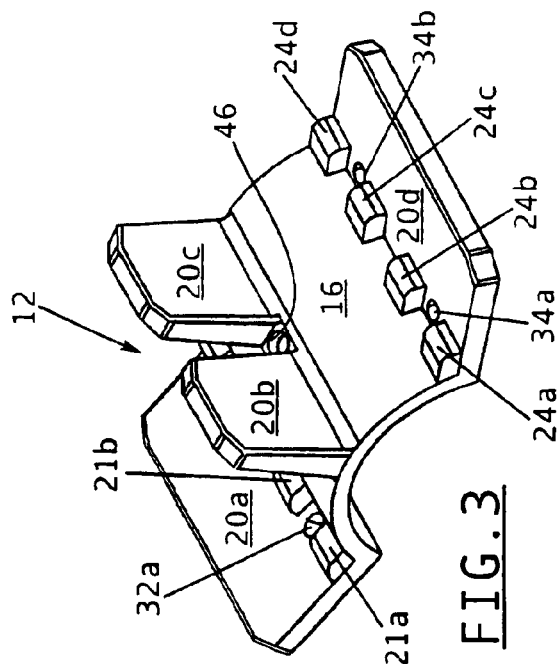
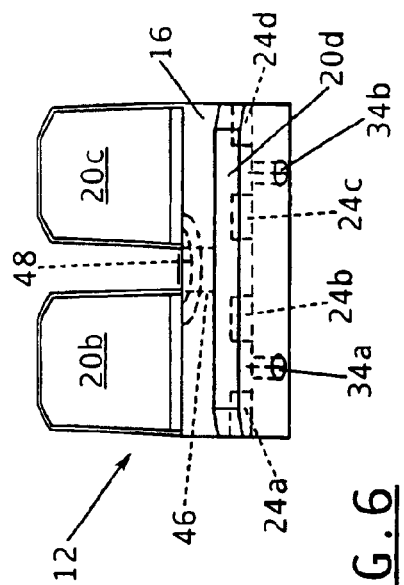
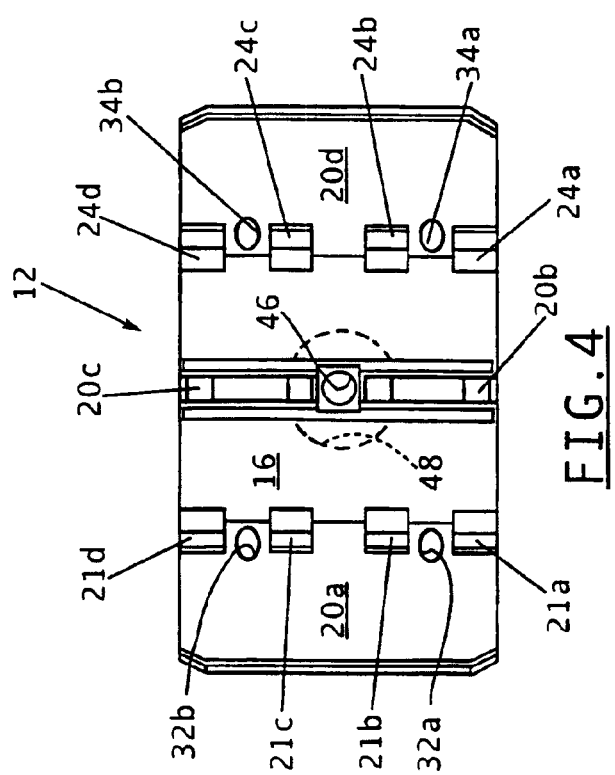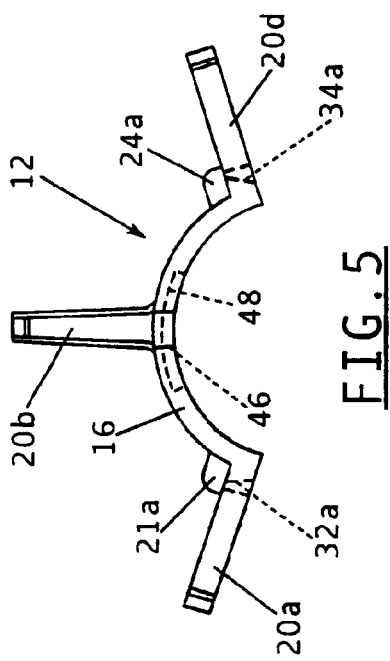

TWO-PIECE CASING SPACER FOR USE WITH PIPES OF VARIOUS DIAMETERS

FIELD OF THE INVENTION

This invention relates generally to fluid carrying pipe arrangements and is particularly directed to apparatus for maintaining fixed spacing between inner fluid carrying pipes having a wide range of diameters and a concentrically disposed outer casing.

BACKGROUND OF THE INVENTION

A pipeline is frequently in the form of an inner liquid carrying pipe disposed within a rigid outer casing. In some cases, plural liquid carrying pipes are disposed within a single rigid outer casing. The carrier pipe, or pipes, disposed within an outer casing is frequently provided for water and sewer mains within highway and railroad crossing pipe casings to maintain carrier pipe alignment, restrain the carrier pipe against flotation or other movement, or maintain the carrier pipe in a fixed position and orientation such as per grade requirements in the case of a gravity sewer. In the case of a single carrier pipe, a single spacer is frequently disposed about the carrier pipe and between the carrier pipe and the outer casing to maintain stationary positioning and fixed spacing of the carrier pipe relative to the outer casing.

Earlier approaches to maintaining positioning of an inner carrier pipe within an outer casing made use of wooden skids banded to the outer periphery of the carrier pipe with steel strapping. Not only is it difficult and time consuming to install the wooden skids, but the wooden skids also frequently catch on welded beads resulting in rotation of the carrier pipe and destabilizing of its joints. Moreover, the wooden skids and steel straps are susceptible to breakage, requiring removal and reinstallation.

The wooden skid approach to positioning a carrier pipe within an outer casing has generally been replaced with casing spacers comprised of stainless steel, galvanized steel, or epoxy coated steel. This type of casing spacer employs two or more shell members each including an inner portion disposed about and engaging the inner carrier pipe and an outer portion engaging the inner surface of the outer casing. The plural shell members are securely coupled together and attached about the inner carrier pipe by means of plural nut and bolt combinations, with each shell member's inner portion being arcuate in shape and its outer portion including plural spaced ribs attached to and extending outwardly from the inner portion and engaging the outer casing's inner surface. These spaced ribs are commonly called "risers".

An example of this later type of casing spacer can be found in U.S. Pat. No. 6,571,832, issued on Jun. 3, 2003 and assigned to the assignee of the present application. The individual sections of this type of casing spacer are sized to fit a specific carrier pipe diameter. To accommodate an inner carrier pipe having a different diameter, at least one casing spacer segment must be replaced with another segment of a different size. In some cases, both casing spacer segments must be replaced when used with an inner carrier pipe of a different diameter. This approach requires a large casing spacer inventory to accommodate a wide range of carrier pipe sizes. In addition, while incorporating non-slip members for more securely engaging the inner carrier pipe, the location of these non-slip members on the casing spacer segments limits their frictional engagement with the carrier pipe reducing the likelihood for fixed attachment to the carrier pipe. In addition, these non-slip members are subject to impact damage because of their position on the inner portion of the casing spacer.

The present invention addresses the aforementioned considerations of the prior art by providing a flexible casing spacer comprised of two complementary segments which are adapted for tight-fitting engagement with inner carrier pipes having a wide range of diameters for securely maintaining the carrier pipe in fixed position within an outer casing. The inventive casing spacer eliminates the requirement for a large inventory of casing spacers of different sizes to accommodate inner carrier pipes of various diameters.

OBJECTS AND SUMMARY OF THE INVENTION

Accordingly, it is an object of the present invention to provide secure, fixed positioning of an inner carrier pipe within an outer, concentrically disposed casing.

It is another object of the present invention to provide a spacer disposed between an inner fluid carrying pipe and an outer casing having high strength, spaced risers radially extending outwardly from a pair of connected flexible, arcuate inner portions which are adapted for tight-fitting positioning on inner pipes having a wide range of diameters.

Yet another object of the present invention is to provide first and second complementary spacer elements for maintaining fixed concentric positioning of an inner fluid carrying pipe within an outer casing, where the spacers are adapted for use with pipes and casings having a range of diameters.

A further object of the present invention is to provide a pair of interconnected pipe spacer elements conformable in shape to tightly engage the outer surface of inner carrier pipes having a wide range of circumferences and maintain the carrier pipes securely and fixedly in position within an outer concentric casing.

A still further object of the present invention is to provide a non-metallic casing spacer such as comprised of a high strength plastic which is equally applicable for use in water distribution systems and natural gas pipelines, as well as for use with an outer casing and an inner carrier pipe containing virtually any type of gas or liquid material.

The present invention contemplates a spacer disposed within an outer casing for engaging and maintaining an inner carrier pipe in fixed position within the outer casing which comprises first and second shell members each having respective flexible, arcuate inner portions disposed about and engaging 180° or less of an outer circumference of the inner carrier pipe and plural rigid risers disposed on and extending radially outward from the inner portion of the shell member, wherein the distal ends of the risers engage an inner surface of the casing and each of the risers includes plural spaced tapered apertures; plural couplers inserted through aligned apertures in the first and second shell members, wherein the flexible, arcuate inner portions of the shell members allow the shell members to be drawn tightly about carrier pipes having a range of diameters when the couplers are tightened and the tapered apertures allow the couplers to assume various orientations relative to the shell members depending upon the carrier pipe's diameter; and first and second friction members disposed within and extending through the flexible, arcuate inner portions of the first and second shell members, respectively, for engaging the carrier pipe and maintaining the spacer in fixed position thereon, wherein the friction members are disposed between and protected from impact damage by adjacent risers on each of the shell members.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 3 is a perspective view of one segment of the two-piece casing spacer of the present invention;

FIG. 4 is a top plan view of the casing spacer segment shown in FIG. 3;

FIG. 5 is an end-on view of the casing spacer segment shown in FIG. 3;

FIG. 6 is a side elevation view of the casing spacer segment shown in FIG. 3.

DETAILED DESCRIPTION OF THE PREFERRED EMBODIMENTS

Figure 1:
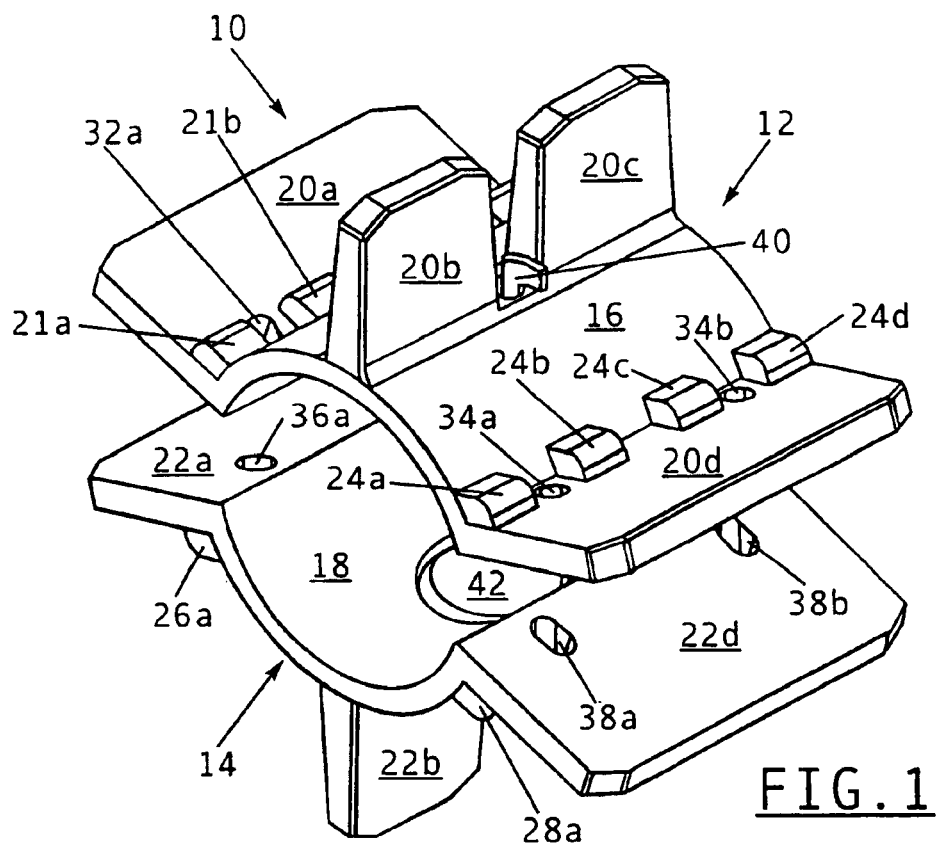
FIG. 1 is a perspective view of a two-piece casing spacer in accordance with the principles of the present invention, without the nut and bolt connector combinations.
Figure 2:
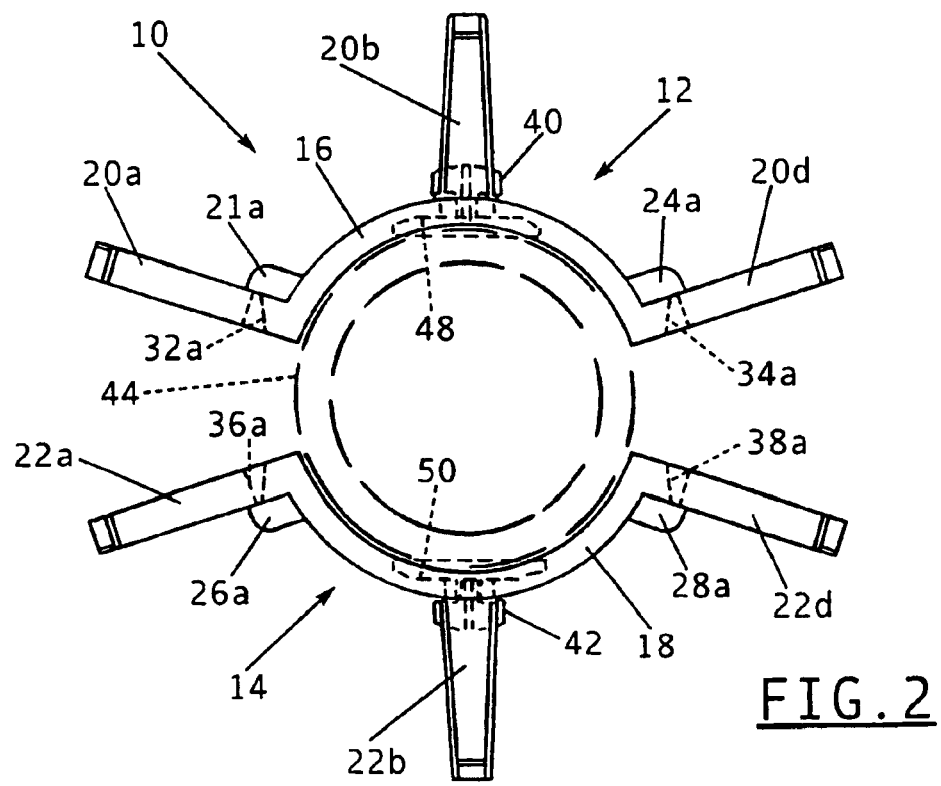
FIG. 2 is an end-on view of the two-piece casing spacer of FIG. 1 shown partially in phantom disposed on an inner carrier pipe.

Referring to FIG. 1, there is shown a perspective view of a casing spacer 10 in accordance with the principles of the present invention. FIG. 2 is an end-on view shown partially in phantom of the inventive casing spacer 10 positioned on an inner carrier pipe 44. FIGS. 3 and 4 are respectively perspective and top plan views of a first shell member 12 of the casing spacer of the present invention, while FIGS. 5 and 6 are respectively end-on and side elevation views of the casing spacer's first shell member.

Casing spacer 10 is comprised of first and second shell members 12, 14 which are preferably identical in size and configuration. First shell member 12 includes a flexible, arcuate inner portion 16 and plural radial ribs, or risers, 20a–20d. The first and fourth risers 20a, 20d are disposed on opposed ends of the first shell member's flexible, arcuate inner portion 16. The second and third risers 20b, 20c are disposed on an outer, central portion of the first shell member's flexible, arcuate inner portion 16 and are arranged in common alignment. Disposed between the second and third risers 20b, 20c is a preferably circular aperture 46 which extends through the first shell member's flexible, arcuate inner portion 16. Aperture 46 is adapted to receive a first non-slip member 40 as described in detail below.

First and second apertures 32a, 32b are disposed within the first riser 20a. Similarly, a pair of spaced apertures 34a, 34b are disposed in the fourth riser 20d. First and second apertures 32, 32b in the first riser 20a and third and fourth apertures 34a, 34b in the fourth riser 20d are each adapted to receive a respective coupler for securely attaching the first and second shell members 12, 14 to an inner carrier pipe 44 which is shown in dotted line form in FIG. 2. Each of the paired apertures 32a, 32b and 34a, 34b in the first and fourth risers 20a, 20d is tapered along the length thereof as shown for the case of apertures 32a, 34a and 36a, 38a in FIG. 2. The tapered apertures in the first and fourth risers of the first and second shell members 12, 14 allow the orientation of a coupler element, such as a bolt, connecting a pair of shell members to change with the size of the diameter of the inner carrier pipe 44 as described in detail below. In accordance with another aspect of the present invention, the arcuate inner portions 16, 18 of the first and second shell members 12, 14 are flexible, while each of the first through fourth risers of the shell members is hard and rigid. In a preferred embodiment, each of the first and second shell members 12, 14 is comprised of a high strength plastic such as polyurethane, where the flexible, arcuate inner portions are thin enough so as to be capable of undergoing a change in shape, while the risers are sufficiently thick so as to be of high strength and remain rigid even when exposed to large applied forces. The nut and bolt combinations for connecting the first and second shell members are also preferably comprised of a high strength plastic such as polyurethane or nylon.

The first shell member 12 further includes first through fourth connector projections 21a–21d which are disposed on the outer surface of the first shell member 12 at the juncture of its flexible, arcuate inner portion 16 and its first riser 20a. Similarly, fifth through eighth connector projections 24a–24d are disposed on the outer surface of the shell member at the juncture of its flexible, arcuate inner portion 16 and its fourth riser 20d. As shown in FIG. 4, adjacent pairs of connector projections are disposed on opposed sides of each of the connector apertures 32a, 32b, 34a and 34b. Each pair of connector projections disposed adjacent a respective one of the aforementioned connector apertures is adapted to engage a nut in a nut and bolt combination used to connect the first and second shell members 12, 14 for maintaining the nut in position over the aperture and preventing the nut from rotating during insertion and tightening or loosening and removal of a bolt within the nut.

The second shell member 14 is similarly configured and includes four risers, where the first, second and fourth risers are shown in the various figures as elements 22a, 22b and 22d. The second shell member 14 similarly includes four coupling apertures, with two in its first riser 22a and two in its fourth riser 22d. Three of the four coupling apertures in the second shell member 14 are shown as elements 36a, 38a and 38b in FIG. 1. The second shell member 14 further includes eight connector projections, where four connector flanges are disposed at the juncture of its first riser 22a and its flexible, arcuate inner portion 18 and four connector projections are disposed at the juncture of its fourth riser 22d and its arcuate inner portion. Two of these connector projections are shown as elements 26a and 28a in the various figures. The second shell member 14 further includes an aperture extending through its flexible, arcuate inner portion 18 between its second riser 22b and its third riser, which is not shown in the various figures. This aperture is adapted to receive a second non-slip member 42 which engages an outer surface of the inner carrier pipe 44. Inner portions of each of the first and second shell members 12, 14 are provided with respective circular recessed portions 48 and 50 which are shown in the various figures in dotted line form. Circular recessed portion 48 is adapted to receive an inner, disc-like pad portion of the first non-slip member 40, while circular recessed portion 50 is adapted to receive an inner, disc-like pad portion of the second non-slip member 42 which also engages a surface portion of the inner carrier pipe 44. These circular recessed portions provide secure, fixed positioning of the inner pad portions of the non-slip members within the shell members.

Figure 9:
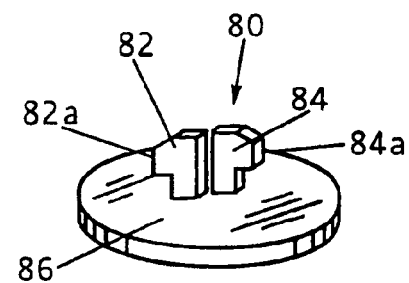
FIG. 9 is a perspective view of a non-slip member for use in a casing spacer of the present invention for securely maintaining the casing spacer in fixed position on an inner carrier pipe.

Referring to FIG. 9, there is shown a perspective view of a non-slip member 80 used in a preferred embodiment of the inventive casing spacer. Non-slip member 80 includes a disc-shaped base 86 attached to which are first and second retaining members 82 and 84. First and second retaining members 82, 84 are preferably integrally formed with the disc-shaped base 86. Non-slip member 80 is preferably comprised of a material which is pliable and possesses a relatively high surface coefficient of friction. The disc-shaped base 86 of each non-slip member 80 is inserted in the aforementioned generally circular recessed portions 48 and 50 of the first and second shell members 12, 14 respectively. The non-slip members disposed in the shell members of casing spacer 10 of the present invention prevent displacement of the casing spacer on the inner carrier pipe, thus maintaining the casing spacer in fixed position between the carrier pipe and an outer casing. This arrangement maintains the carrier pipe in fixed position within the outer casing.

Casing spacers in accordance with the present invention are preferably spaced within two (2) feet of each end of the outer casing, with the remaining casing spacers spaced every eight (8) feet along the length of the carrier pipe. Non-slip member 80 is preferably comprised of a material such as plastic or leather which is adapted to frictionally engage pipes having a wide range of compositions and which is particularly adapted for securely engaging pipes comprised of polyvinyl chloride PVC). Each of the first and second retaining members 82, 84 of the non-slip member 80 includes a respective projection 82a and 84a on its distal end as shown in the perspective view of FIG. 9. With the non-slip member 80 comprised of a flexible, pliant material, the first and second retaining members 82, 84 may be displaced toward or away from one another by engaging them with one's fingers. In this manner, the first and second retaining members 82, 84 may be moved towards one another when removing the non-slip member 80 from an aperture within a casing spacer's shell member to permit passage of the retaining members 82a, 84a through the aperture. With the non-slip member's disc-shaped base disposed in contact with an inner surface of the casing spacer shell member and with retaining member projections 82a and 84a disposed on an opposed side of the shell member, the two retaining members may then be released, allowing the retaining member projections 82a, 84a to engage the opposed side of the shell member to prevent removal of the non-slip member 80 from the casing spacer's shell member. While the retaining member's base 86 is described herein as being disc-shaped, the base is not limited to this shape and may assume virtually any geometric shape.

Figure 7:
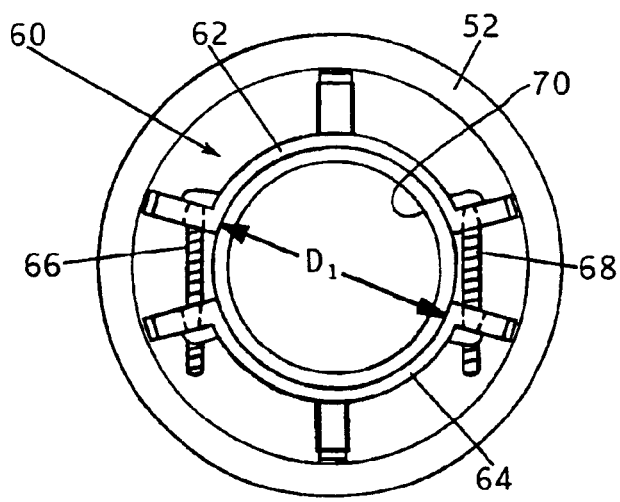
FIG. 7 is an end-on view showing a two-piece casing spacer in accordance with the present invention positioned on an inner carrier pipe and within an outer casing.

Referring to FIG. 7, there is shown an end—end view of a casing spacer 60 in accordance with the present invention disposed about and engaging a first carrier pipe 70. Casing spacer 60 is also shown disposed within a first casing 52. As in the previously described embodiment, casing spacer 60 includes first and second shell members 62 and 64 which are connected together by plural nut and bolt combinations, where first and second nut bolt combinations are shown as elements 66 and 68. The first carrier pipe 70 is shown as having an outer diameter $D_1$. As shown in FIG. 7, the size of the first carrier pipe 70 is such that a gap exists between adjacent end portions of the first and second shell member 62, 64. The gaps between the first and second shell members 62, 64 are spanned by the first and second nut and bolt combinations 66 and 68.

Figure 8:
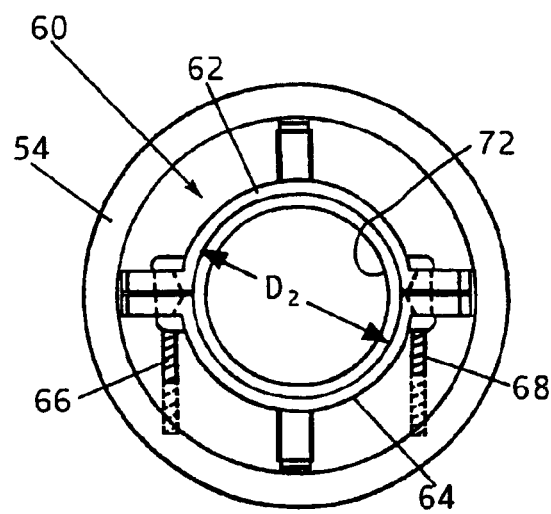
FIG. 8 is an end-on view of the inventive two-piece casing spacer similar to that shown in FIG. 7, where the casing spacer is attached to an inner carrier pipe of smaller diameter.

Referring to FIG. 8, there is shown an end-on view of the same casing spacer 60 disposed about a second carrier pipe 72. In FIG. 8, casing spacer 60 is also shown disposed within an outer second casing 54. The second carrier pipe 72 is shown as having a diameter $D_2$, where $D_2<D_1$. Because of the smaller diameter of the second carrier pipe 72, there is no gap between adjacent end portions of the casing spacer's first and second shell members 62 and 64. Moreover, it can be seen that the orientation of the nut and bolt combinations 66 and 68 within the aligned apertures in the first and second shell members 62 and 64 is different in the installations shown in FIGS. 7 and 8. In the configuration of FIG. 8, each of the first and second nut and bolt combinations 66 and 68 is aligned generally at right angles to the end risers of the first and second shell members 62, 64. In the configuration of FIG. 7, the first and second nut and bolt combinations 66 and 68 are oriented at an acute angle relative to the end risers of the first and second shell members 62 and 64. It is the tapered shape of the connector apertures in each of the first and second shell members 62, 64 which allows each of the connecting elements (bolts) to assume a different orientation and position relative to the two casing spacer shell members depending upon the outer diameter of the inner carrier pipe. The two bolts in the nut and bolt combinations 66, 68 are shown as having distal ends in dotted line form. The length of the two bolts is such that the illustrated bolts could not be used with the illustrated combination of carrier pipe 72 and outer casing 54. The two bolts are too long. Thus, the distal ends of the two bolts (shown in dotted line form) have been removed so that the bolts do not contact the outer casing 54. By using plastic bolts of substantial length, the same bolts may be used to connect two shell members about a carrier pipe of large diameter (where long bolts are required) as well as to connect two shell members about a carrier pipe of small diameter (where short bolts are required) by removing the ends of the bolts in the latter case.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A spacer disposed within an outer casing for engaging and maintaining an inner carrier pipe in fixed position within said outer casing, said spacer comprising:

first and second shell members each having respective flexible, arcuate inner portions disposed about and engaging 180° or less of an outer circumference of the inner carrier pipe and plural rigid risers disposed on and extending radially outward from the inner portion of the shell member, wherein distal ends of said risers engage an inner surface of the casing and each of said risers includes plural spaced tapered apertures;

plural couplers inserted through aligned apertures in said first and second shell members, wherein said flexible, arcuate inner portions of said shell members allow said shell members to be drawn tightly about carrier pipes having a range of diameters when said couplers are tightened and said tapered apertures allow said couplers to assume various orientations relative to said shell members depending upon the carrier pipe's diameter; and first and second friction members disposed within and extending through the flexible, arcuate inner portions of said first and second shell members, respectively, for engaging the carrier pipe and maintaining the spacer in fixed position thereon, wherein said friction members are disposed between and protected from impact damage by adjacent risers on each of said shell members wherein in each of said first and second shell members includes a first pair of aligned risers disposed in a spaced manner along a center, outer portion of the shell member's flexible, arcuate inner portion, and wherein each friction member is disposed intermediate said first pair of aligned risers.

2. The spacer of claim 1 wherein each of said friction members is disposed within and extends through an aperture in the flexible, arcuate inner portion of each of said shell members, and wherein said apertures are disposed intermediate the first pair of aligned risers of said shell member.

3. The spacer of claim 2 wherein each of said friction members includes an inner, disc-like pad engaging the carrier pipe and outer projections extending beyond an outer portion of the shell member's flexible, arcuate inner portion.

4. The spacer of claim 3 wherein the outer projections of each of said friction members are manually engageable for positioning said friction member within and removing said friction member from said shell member and for maintaining said friction member securely positioned in said shell member.

5. The spacer of claim 3 wherein an inner surface of the flexible, arcuate inner portion of each shell member includes a recessed portion aligned with the aperture in the shell member, and wherein said recessed portion is adapted to receive the inner, disc-like pad of a friction member.

6. The spacer of claim 3 wherein the friction members in said first and second shell members are disposed 180° apart on the inner carrier pipe and are aligned with said plural couplers for drawing said friction members directly to one another when said couplers are tightened.

7. The spacer of claim 1 wherein each of said shell members further includes a second pair of risers each disposed at a respective, opposed end of a shell member.

8. The spacer of claim 7 wherein each of said plural spaced tapered apertures is disposed in said a second pair of risers.

9. The spacer of claim 1 wherein each of said couplers includes a respective nut and bolt combination.

10. The spacer of claim 9 wherein each nut and bolt combination is comprised of plastic and the length of a bolt may be shortened so as not to engage the outer casing when said shell members are disposed about an inner carrier pipe of reduced diameter.

11. The spacer of claim 9 further comprising plural paired projections disposed on opposed sides of each of the apertures in said a second pair of risers for engaging and preventing rotation of a coupler inserted through an aperture during tightening or loosening of a coupler.

12. The spacer of claim 11 wherein each of said paired projections is disposed at a juncture between the flexible, arcuate inner portion and each of said second pair of risers of a shell member for reinforcing the shell member.

13. The spacer of claim 1 wherein said shell members, couplers and friction members are non-metallic in composition.

14. A spacer disposed between and engaging an inner carrier pipe and an outer casing for maintaining said inner carrier pipe in fixed, coaxial alignment with said outer casing, said spacer comprising:

first and second shell members of the same configuration and size and each having a flexible, arcuate inner portion engaging an outer surface of the carrier pipe and plural outer risers extending radially outwardly from said flexible, arcuate inner portion and having respective distal ends engaging an inner surface of the outer casing, wherein an entire inner surface of each of said flexible, arcuate inner portions of said shell members is adapted to engage 180° or less of an outer circumference of the carrier pipe, and wherein first and fourth risers are disposed on opposed ends of said flexible, arcuate inner portion and second and third risers are disposed on or adjacent a centerline of said flexible, arcuate inner portion and are in common alignment, each of said first and fourth risers having plural spaced apertures therein;

plural couplers attaching said first and second shell members and extending through the apertures in said first and fourth risers for securely positioning the spacer on the inner carrier pipe; and first and second frictional engaging members attached to and extending through respective apertures in the flexible, arcuate inner portions of said first and second shell members, wherein each of said apertures is disposed intermediate said second and third risers on said shell members and terminates in an enlarged recessed portion on an inner surface of a flexible, arcuate inner portion of the shell member, and wherein each of said frictional engaging members includes an enlarged inner pad disposed in said enlarged recessed portion and engaging the inner carrier pipe's outer surface and each of said frictional engaging members further includes an outer retainer disposed intermediate said second and third risers for maintaining said frictional engaging member in position within a shell member.

15. A spacer disposed between and engaging an inner carrier pipe and an outer casing for maintaining said inner carrier pipe in fixed, coaxial alignment with said outer casing, said spacer comprising:

first and second shell members of the same configuration and size and each having a flexible, arcuate inner portion engaging an outer surface of the carrier pipe and plural outer risers extending radially outwardly from said flexible, arcuate inner portion and having respective distal ends engaging an inner surface of the outer casing, wherein an entire inner surface of each of said flexible, arcuate inner portions of said shell members is adapted to engage 180° or less of an outer circumference of the carrier pipe, and wherein first and fourth risers are disposed on opposed ends of said flexible, arcuate inner portion and second and third risers are disposed on or adjacent a centerline of said flexible, arcuate inner portion and are in common alignment, each of said first and fourth risers having plural spaced apertures therein;

plural couplers attaching said first and second shell members and extending through the apertures in said first and fourth risers for securely positioning the spacer on the inner carrier pipe; and first and second frictional engaging members attached to and extending through respective apertures in the flexible, arcuate inner portions of said first and second shell members, wherein each of said apertures is disposed intermediate said second and third risers on said shell members and terminates in an enlarged recessed portion on an inner surface of a flexible, arcuate inner portion of the shell member, and wherein each of said frictional engaging members includes an enlarged inner pad disposed in said enlarged recessed portion and engaging the inner carrier pipe's outer surface and each of said frictional engaging members further includes an outer retainer disposed intermediate said second and third risers for maintaining said frictional engaging member in position within a shell member;

wherein said shell members, said couplers and said frictional engaging members are non-metallic in composition.

\* \* \* \* \*

UNITED STATES PATENT AND TRADEMARK OFFICE
CERTIFICATE OF CORRECTION

PATENT NO. : 6,896,004 B1
DATED : May 24, 2005
INVENTOR(S) : William N. Witzel

It is certified that error appears in the above-identified patent and that said Letters Patent is hereby corrected as shown below:

Column 7,
Line 13, delete "in".
Line 58, delete "a".

Signed and Sealed this

Thirtieth Day of August, 2005

JON W. DUDAS
*Director of the United States Patent and Trademark Office*